(12) United States Patent
Chardin et al.

(10) Patent No.: US 7,438,099 B2
(45) Date of Patent: Oct. 21, 2008

(54) SAFETY SUPPORT WITH IMPROVED ENDURANCE

(75) Inventors: Hervé Chardin, Clermont-Ferrand (FR); Michael Cogne, Riom (FR); Noël Morel, Enval (FR)

(73) Assignee: Michelin Recherche Et Technique S.A., Granges-Paccot (CH)

( * ) Notice: Subject to any disclaimer, the term of this patent is extended or adjusted under 35 U.S.C. 154(b) by 375 days.

(21) Appl. No.: 11/409,430

(22) Filed: Apr. 21, 2006

(65) Prior Publication Data

US 2006/0237111 A1    Oct. 26, 2006

Related U.S. Application Data

(63) Continuation of application No. PCT/EP2004/011706, filed on Oct. 18, 2004.

(30) Foreign Application Priority Data

Oct. 24, 2003    (FR) .................................. 03 12499

(51) Int. Cl.
*B60C 17/04* (2006.01)
*B60C 17/06* (2006.01)
(52) U.S. Cl. ...................... 152/158; 152/520
(58) Field of Classification Search ................ 152/158, 152/516, 520
See application file for complete search history.

(56) References Cited

U.S. PATENT DOCUMENTS

| | | | |
|---|---|---|---|
| 2,053,245 A | 9/1936 | Girz | |
| 3,682,219 A | 8/1972 | Lindley | |
| 3,990,491 A | 11/1976 | Hampshire et al. | |
| 4,163,466 A * | 8/1979 | Watts | 152/158 |
| 4,248,286 A * | 2/1981 | Curtiss et al. | 152/158 |
| 4,281,700 A * | 8/1981 | Ross | 152/158 |
| 5,363,894 A * | 11/1994 | Gouttebessis et al. | 152/158 |
| 5,685,926 A | 11/1997 | Kejha | |
| 5,836,366 A | 11/1998 | Muhlhoff | |
| 5,891,279 A | 4/1999 | Lacour | |
| 6,470,936 B2 | 10/2002 | Pauc et al. | |
| 6,564,842 B2 | 5/2003 | Abinal et al. | |
| 2002/0148546 A1 * | 10/2002 | Tabor et al. | |

(Continued)

FOREIGN PATENT DOCUMENTS

DE    2748886    5/1979

(Continued)

*Primary Examiner*—Adrienne C Johnstone
(74) *Attorney, Agent, or Firm*—Fitzpatrick, Cella, Harper & Scinto

(57) ABSTRACT

A safety support includes a substantially cylindrical base configured to conform to the rim. The support further includes a crown with a radially outer wall configured to enter into contact with an internal wall of a crown of the tire in the event of a loss of pressure and to leave clearance therebetween at the rated operating pressure of the tire. The safety support further includes an annular body linking the base and the crown of the support. An envelope of the radially outer wall of the support crown is defined, when the support is mounted on the rim, with f being the deflection undergone by the support mounted on the rim under a load Z, the rated load of the tire, the envelope being confined between two cylinders of revolution of radius $R_{max}$ and $R_{min}$ satisfying the following relationship:

$$0.2f < R_{max} - R_{min} < 2f.$$

11 Claims, 5 Drawing Sheets

U.S. PATENT DOCUMENTS

| | | |
|---|---|---|
| 2003/0000623 A1* | 1/2003 | Tabor et al. |
| 2003/0168142 A1 | 9/2003 | Bernadot et al. |
| 2005/0076983 A1 | 4/2005 | Kimura et al. |

FOREIGN PATENT DOCUMENTS

| | | |
|---|---|---|
| EP | 0796747 | 12/2004 |
| EP | 1486356 | 12/2004 |
| FR | 1475161 | 3/1967 |
| FR | 2579527 | 10/1986 |
| FR | 2720977 | 12/1995 |
| JP | 01074106 | 3/1989 |
| JP | 06305310 | 11/1994 |
| WO | 0005083 | 2/2000 |
| WO | 0076791 | 12/2000 |
| WO | 0224476 | 3/2002 |
| WO | 03099591 | 12/2003 |

* cited by examiner

SAFETY SUPPORT WITH IMPROVED ENDURANCE

CROSS-REFERENCE TO RELATED APPLICATIONS

This application is a continuation of International Application PCT/EP2004/011706, filed Oct. 18, 2004, which claims priority to French Patent Application 03/12499, filed Oct. 24, 2003, both of which are incorporated herein by reference in their entirety.

BACKGROUND OF THE INVENTION

1. Field of the Invention

The present invention relates to safety supports for vehicle tires, intended to be mounted on the rims thereof, inside the tires, to support the load in the event of tire failure or abnormally low inflation pressure. The present invention relates, more particularly, to structural safety supports, generally made from an elastomeric material.

2. Description of the Related Art

U.S. Pat. No. 5,891,279 (counterpart to EP 0 796 747), which is incorporated herein by reference, describes a safety support in which the crown has an outer wall which takes the form substantially of a cylinder of revolution and comprises longitudinal grooves. U.S. Pat. No. 6,564,842 (counterpart to WO 00/76791), which incorporated herein by reference, also describes such a safety support.

To improve the endurance of the safety support and tire assemblies when running flat or at reduced inflation pressure, lubricating compositions or gels are usually incorporated on the inner face of the tire. These gels are intended to reduce the friction between the support and the inner face of the tire surrounding the support. Such gels usually comprise a lubricant such as glycerol and a thickener such as silica.

SUMMARY OF THE INVENTION

The invention provides a safety support whose endurance performance when running flat is improved relative to prior supports. The safety support includes a substantially cylindrical base configured to conform to the rim. The support further includes a crown with a radially outer wall configured to enter into contact with an internal wall of a crown of the tire in the event of a loss of pressure and to leave clearance therebetween at the rated operating pressure of the tire. The safety support further includes an annular body linking the base and the crown of the support. An envelope of the radially outer wall of the support crown is defined, when the support is mounted on the rim, with f being the deflection undergone by the support mounted on the rim under a load Z, the rated load of the tire, the envelope being confined between two cylinders of revolution of radius $R_{max}$ and $R_{min}$ satisfying the following relationship:

$$0.2f < R_{max} - R_{min} < 2f \text{ and}$$

preferably, this difference satisfies:

$$0.3f < R_{max} - R_{min} < f.$$

It should be noted that the surface of revolution E is defined solely in the zones of the outer wall of the crown intended to come into contact with the internal wall of the crown of the tire when running flat. That is to say that account is taken only of the parts of the wall which actually come into contact with the internal wall of the crown of the tire when running flat. In particular, account is not taken of the radius of the bottom of the grooves disposed along the crown. These groove bottoms do not come into contact with the internal wall of the crown of the tire when running flat.

This surface of revolution E may be determined in practice by geometric measurements of the support mounted on its operating rim. E is also very close to the theoretical profile E' of the envelope of the outer wall of the crown of the support. In the following, the surface of revolution E will be known as the envelope of the outer wall of the crown of the support. The differences between the two surfaces of revolution E and E' are associated in particular with the many uncertainties of support manufacture, contraction of the materials after molding, cross-linking or vulcanization thereof, untrue roundness of the operating rim etc.

It is advantageous to arrange the zone of minimum radius of the surface E, the envelope of the outer wall of the crown, axially at at least one lateral end of the crown of the support.

The zone of minimum radius $R_{min}$ is preferably disposed on the side of the support intended to be positioned on the outside of the vehicle.

The envelope E of the outer wall of the crown of a safety support according to the invention may also comprise a second zone of radius $R'_{min}$, greater than or equal to $R_{min}$, disposed axially on the other side of the circumferential median plane P from the zone of radius $R_{min}$ and satisfying the relationship:

$$0.2f < R_{max} - R'_{min} < 2f$$

and preferably $$0.3f < R_{max} - R'_{min} < f.$$

The presence of these zones of smaller radius disposed at least at one lateral end of the crown of the support makes it possible to limit damage to the internal wall of the tire as well as to the crown of the support when running flat and thus to increase significantly the endurance of the tire/support assembly under such flat-running conditions.

BRIEF DESCRIPTION OF THE DRAWINGS

A number of embodiments of safety supports according to the invention will now be described with reference to the attached drawings, in which.

DETAILED DESCRIPTION OF THE PREFERRED EMBODIMENT

Figure 1:
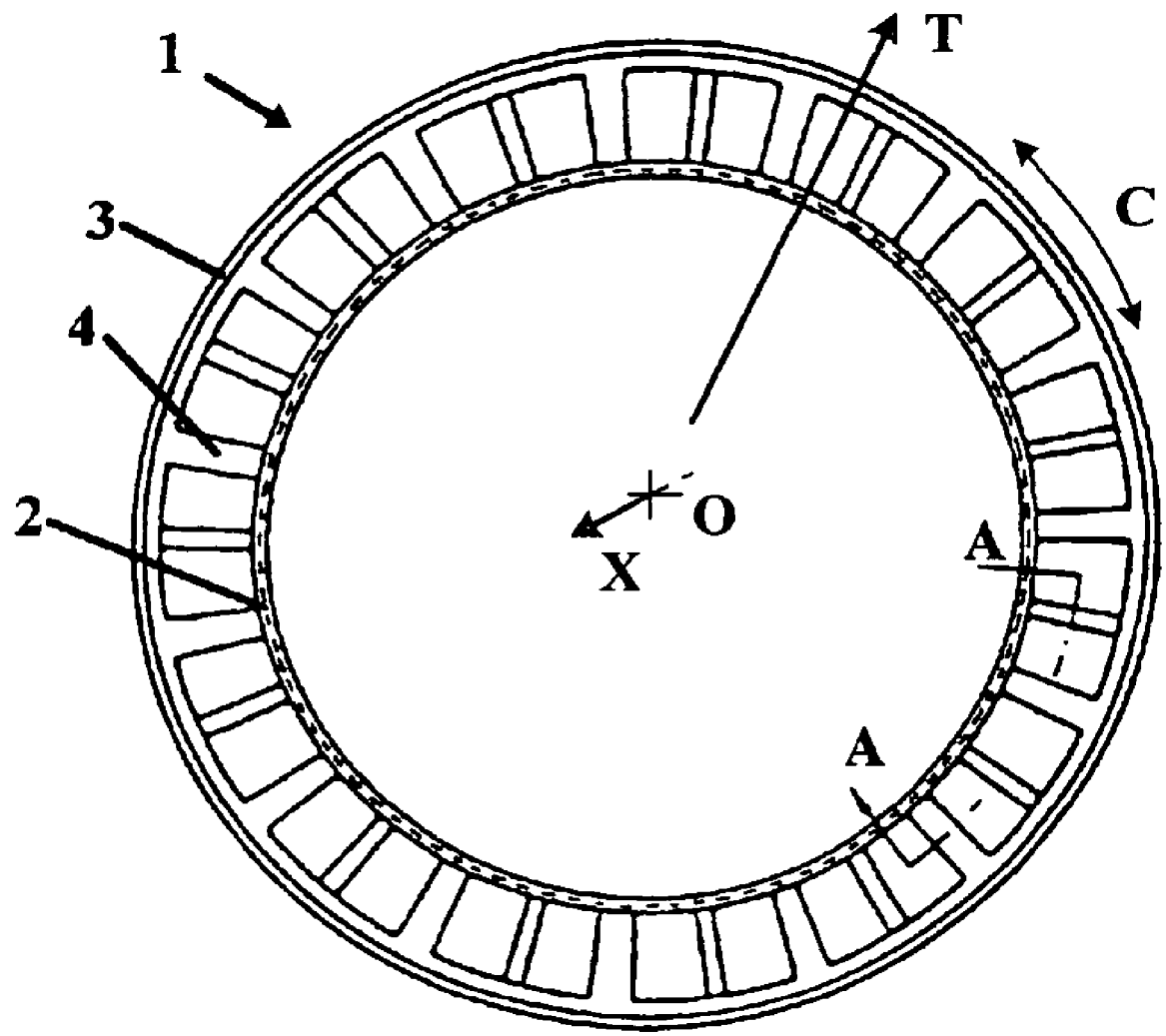
FIG. 1 is a side view of a safety support.

FIG. 1 shows a side view of a safety support 1 corresponding to those in U.S. Pat. No. 6,564,842. This support comprises three parts: a base 2, of generally annular shape; a substantially annular crown 3, having longitudinal grooves 5 (see FIG. 3) on the radially outer wall thereof; and an annular body 4 connecting the base 2 and crown 3.

FIG. 1 also specifies the geometric conventions used in the present application. The axis X passing through O is the axis of rotation of the support (axis X is perpendicular to the plane of FIG. 1). After mounting the support in the cavity of a tire and around a rim, the axis X is also the common axis of rotation of the support, the tire and the rim. The direction T is a radial direction, that is to say passing through the axis X and perpendicular thereto. The direction C is a circumferential direction; at any point of the support, the tire or the rim, this circumferential direction is perpendicular to the radial direction passing through this point as well as to the axis X.

Figure 2:
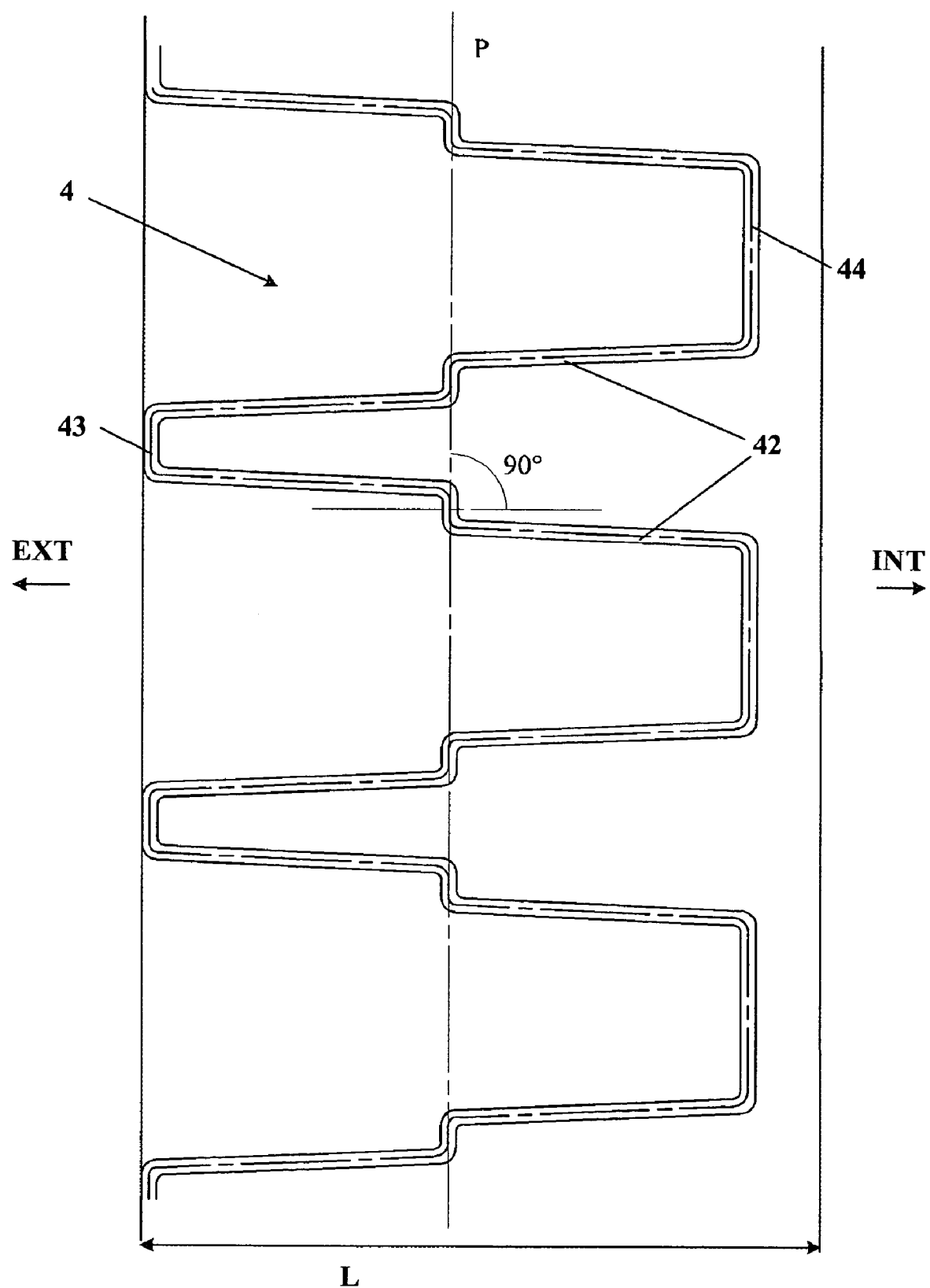
FIG. 2 is a section AA as indicated in FIG. 1 of an example of an annular body of a safety support according to the invention.

FIG. 2 is a section AA as indicated in FIG. 1 of an example of an annular body of a safety support according to the invention. This example is described in U.S. Pat. No. 6,564,842. This annular body 4 comprises radial partitions 42 distributed over the circumference of the support and extending axially on either side of plane P (the circumferential median plane) and radial junctions 43 and 44 extending substantially circumferentially and connected at each of their ends to two adjacent partitions 42. In the example shown, the junctions 43 and 44 have different circumferential lengths. The longer circumferential junctions 44 are preferably positioned on the side of the support designed to be disposed towards the inside of the vehicle. The junctions may be disposed along the lateral edge of the annular body (e.g., 43) or set back therefrom (e.g., 44). The geometry of this FIG. 2 is shown only by way of example and a very large number of other geometries of the annular body may be used for the safety supports according to the invention.

Figure 3:
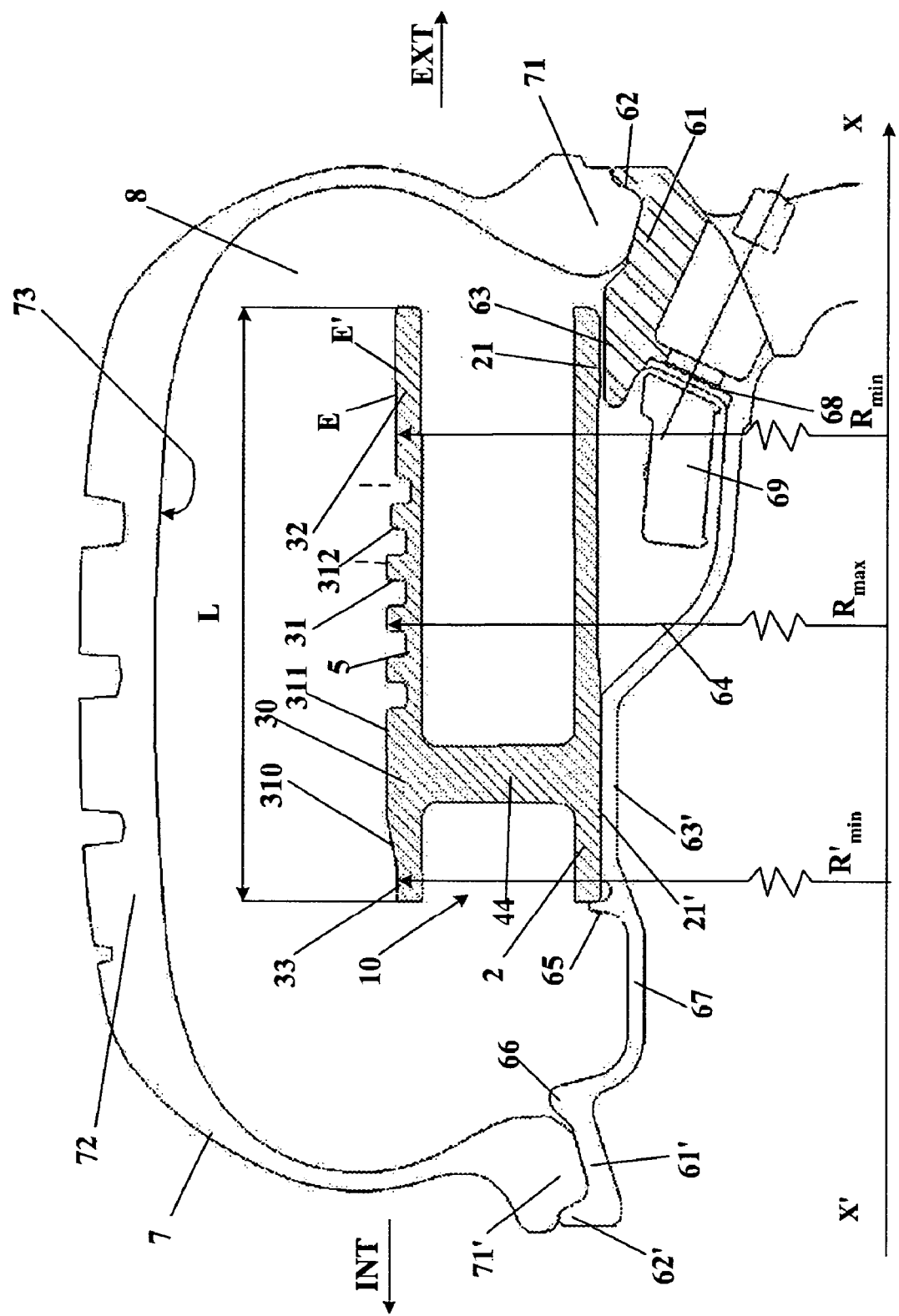
FIG. 3 is a view in axial section of an assembly made up of a safety support according to the invention mounted on a wheel rim and of a tire.

FIG. 3 is a view in axial section of an assembly made up of a safety support according to the invention mounted on a wheel rim and of a tire. This Figure shows the "outer" (EXT) and "inner" (INT) sides of the assembly, that is to say those intended to be disposed towards the outside of the vehicle or towards the inside of the vehicle. As described above, the safety support 10 comprises a base 2, an annular body 4 and a crown 30.

The wheel rim 6 is described in particular in U.S. Pat. No. 6,470,936 (counterpart to WO 00/05083), which is incorporated herein by reference, and comprises two rim seats 61 and 61', outer and inner respectively, of unequal diameters and whose generatrices are inclined towards the outside. The inner seat 61' disposed on the inner side has a diameter greater than that of the outer seat 61. The two seats are extended externally by protrusions or humps 62 and 62'. The outer seat 61 is extended axially towards the inside by a first bearing surface 63 followed by a circumferential channel 64, and a second bearing surface 63'. The second bearing surface 63' is provided at its end facing towards the inside of the vehicle with a positioning stop 65. As the Figure indicates, the safety support 10 comes to bear radially on the two bearing surfaces 63 and 63' and axially against the stop 65. It should be noted that the circumferential junction element 44 is disposed axially opposite the bearing surface 63' to ensure good transmission of forces between the support and the rim. Likewise, the junction element 43 is preferably disposed opposite the bearing surface 63. The inner seat 61' is extended axially towards the outside of the vehicle by a rim flange 66, the flange defining with the positioning stop 65 a mounting channel 67. The rim 6 also comprises a valve hole 68 disposed in the outer sidewall of the circumferential channel 64. A valve and an inflation pressure measuring device 69 are fixed to this valve hole.

A tire 7 is mounted on the rim 6. This tire 7 comprises in particular two beads 71 and 71' surrounding the rim seats 61 and 61' and a crown 72 whose internal wall 73 is designed to come to rest against the crown 30 of the support in the event of significant inflation pressure loss and flat running.

The support 10 is a support according to the invention. Its crown 30 comprises three parts, a central portion 31 whose outer envelope reaches the maximum radius $R_{max}$, an outer lateral part 32 whose outer envelope has a radius $R_{min}$ and an inner lateral part 33 whose outer envelope has a radius $R'_{min}$. The outer and inner lateral parts 32 and 33 respectively have substantially the geometry of a cylinder of revolution. The central portion 31 comprises axially from the inside towards the outside of the vehicle a substantially conical zone 310 whose radius varies from $R'_{min}$ to $R_{max}$, a zone 311 whose outer envelope is a cylinder of revolution of the radius $R_{max}$, and then a second transitional zone 312 forming a transition to the outer zone 32. The zones 311 and 312 comprise circumferential grooves 5. Such grooves 5 may also be disposed in the lateral zones 33 and 32.

The crown 30 of the support 10 thus comprises at its two lateral ends a zone of a radius smaller than the maximum radius of the central portion.

Figure 4:
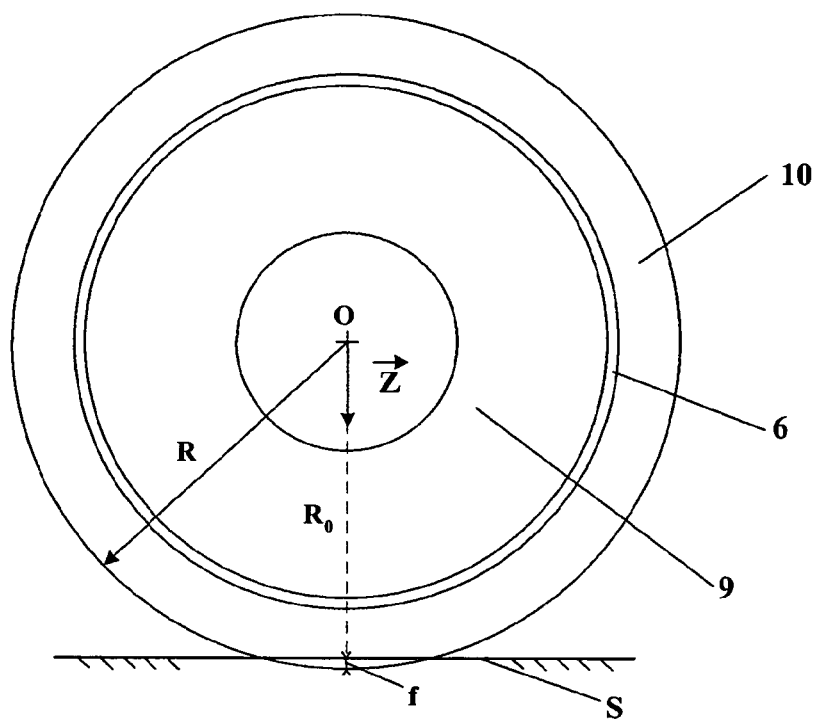
FIG. 4 is a schematic side view of a safety support mounted on a wheel rim, the assembly being subjected to a load Z.

The value of these differences between $R_{max}$ and $R_{min}$ and $R'_{min}$ is explained with reference to FIG. 4, which is a schematic representation of an assembly of a wheel (composed of a disc 9 and a rim 6) and safety support 10 coming to bear on a flat surface S.

The wheel/safety support assembly 10 is mounted on a chuck (not shown) with an axis X passing through O. In the unloaded state, the outer radius R of the assembly corresponds to the radius $R_{max}$ of the central portion 31 of the crown 30 of the support 10. On the other hand, at the center of the contact zone between the wheel/safety support assembly and the surface S, when a load Z is applied at O, the radius diminishes and becomes $R_0$. The value of the difference between R and $R_0$ is known as the deflection f, the rated load of the tire, which is the maximum load which the tire can bear in operation, having been selected as the load Z. This value is defined by European Tyre and Rim Technical Organization (ETRTO) standards.

The value of f is easily determined experimentally by following the above mode of operation. This is done at 20° C. It is of course important to choose as the wheel and rim the safety support operating wheel and rim, that is to say, the wheel and rim for which the safety support has been designed.

The Applicants have surprisingly noted that selecting for the values $R_{max}$, $R_{min}$ and $R'_{min}$ values which satisfy the following relationship:

$$0.2f < R_{max} - R_{min} < 2f \text{ and preferably}$$

$$0.3f < R_{max} - R_{min} < f$$

significantly improves endurance performance during flat running for a given quantity of lubricant introduced into the inner cavity 8 (see FIG. 3) of the tire.

It should be noted that the main constituent material of the safety supports may vary widely. The mechanical properties of these supports and, in particular, the deflection f under a given load and for a given rim geometry will also vary widely. By way of example, the modulus of elasticity of a rubber mix may vary between 8 and 40 MPa, whereas that of a polyurethane elastomer or a thermoplastic elastomer may vary between 20 and 150 MPa. We shall take as an example the modulus of extension at 10% deformation and 20° C.

Tests have been performed with a 120×440–40 safety support of rubber material, where 120 corresponds to the width in mm of the support, 440 to its diameter in mm and 40 to its height, also in mm.

It has been noted that the value of the deflection undergone by the support and operating rim assembly under the rated load Z=450 kg is 6 mm. The difference between the values $R_{max}$ and $R_{min}$ or $R'_{min}$ was zero for the control (crown geometry substantially that of a cylinder of revolution) and 2 mm for the support according to the invention.

The support/rim/tire assemblies were tested at 100 km/h, after the introduction of 90 grams of a lubricant composed mainly of glycerol and silica. The test vehicle was a Renault Scenic 2 and the tire/wheel/support assembly tested during flat running was disposed at the rear of the vehicle. The test circuit was a circuit of the motorway type.

The control assembly traveled for a distance of 70 km running flat, that is to say with a relative inflation pressure of zero between the cavity of the tire and the ambient air, before damage occurred to the internal wall 73 of the tire in particular opposite the outer end of the crown of the support. Stoppage was caused by abrasion between these two opposing surfaces. This abrasion may be deemed to be due to a lack of lubrication between these surfaces.

The assembly comprising a support 10 according to the invention traveled a distance of 180 km before stopping. This result shows the very clear benefit in modifying the external geometry of the crown of the supports in order to optimize the flat-running endurance performance of the safety support/wheel/tire assemblies.

Figure 5:
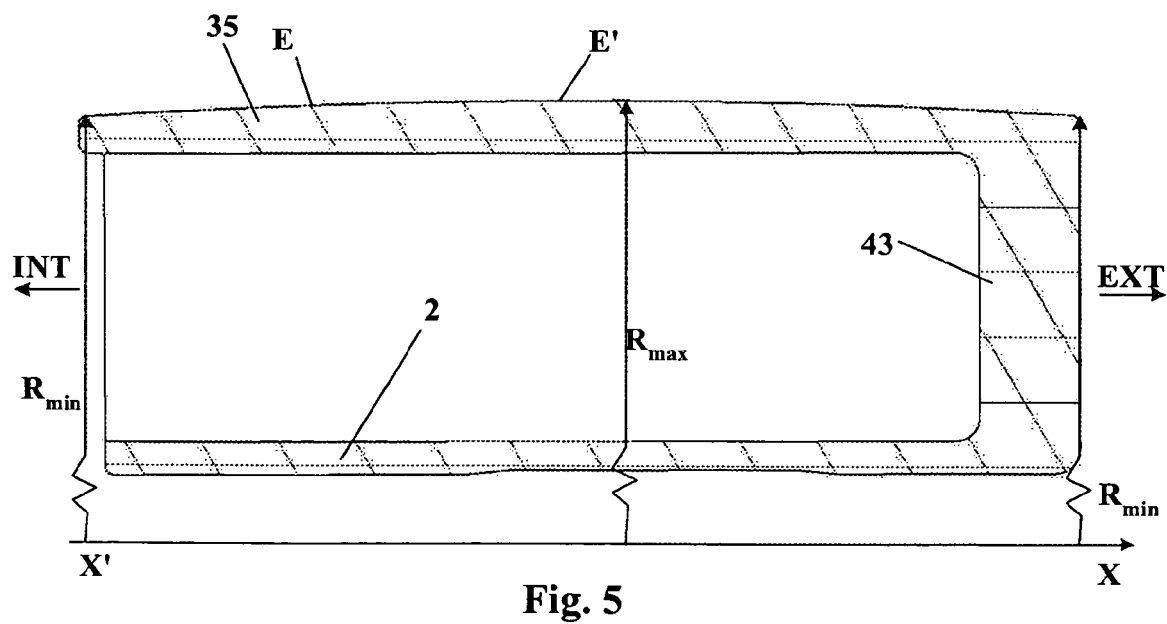
FIG. 5 is an axial section of a second example of a safety support according to the invention.

FIG. 5 shows a second example of a safety support. The crown 35 comprises an outer wall curved axially such that the outer radius of the support is $R_{max}$ at the center of the crown and $R_{min}$ at the two lateral ends. As above, the order of magnitude of the deflection undergone by this support under flat-running operating conditions on its operating rim is of the order of 6 mm and the variation in radius is of the order of 2 mm.

Figure 6:
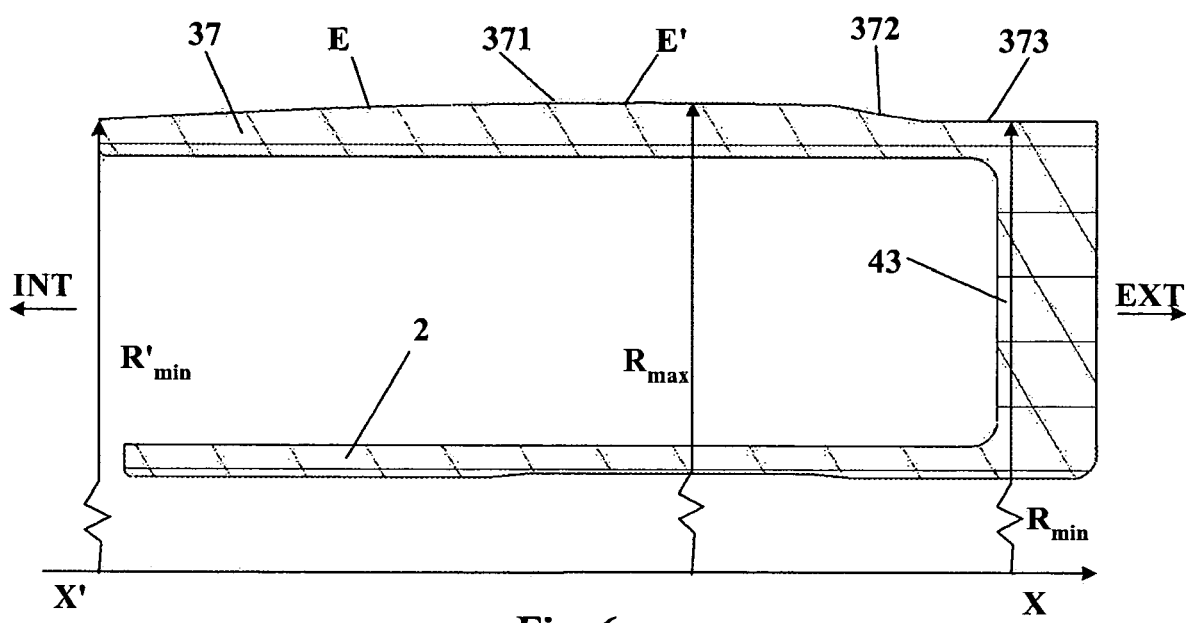
FIG. 6 is an axial section of a third example of a safety support according to the invention.

FIG. 6 shows a third example of a safety support. The crown 37 comprises an outer wall with, axially from the outside towards the inside, a first zone 373 in the form of a cylinder of revolution, of the radius $R_{min}$, a conical zone 372, then a zone 371 curved substantially constantly such that at the inner end of the crown there is a radius $R'_{min}$ very close to the radius $R_{min}$.

In the Figures showing the three illustrated examples of safety supports according to the invention, the surfaces E and E' have been merged.

The Applicants have also noted that, when the variation in radius is less than 0.2 f, the consequences with regard to performance were not significant given the variation inherent in the manufacture of supports and in the endurance tests. On the other hand, when this variation in radius is increased beyond 2f, the opposite effect from that desired is observed.

The three crown geometries described have been described only by way of example and numerous other possibilities are feasible without going beyond the scope of this invention.

What is claimed is:

1. A safety support for mounting on a rim inside a tire fitted on a vehicle, to support a tread of the tire in the event of a loss of inflation pressure, the safety support comprising:
   a substantially cylindrical base configured to conform to the rim;
   a crown with a radially outer wall configured to enter into contact with an internal wall of a crown of the tire in the event of a loss of pressure and to leave clearance therebetween at the rated operating pressure of the tire; and
   an annular body linking the base and the crown of the support;
   wherein an envelope of the radially outer wall of the support crown is defined, when the support is mounted on the rim, with f being the deflection undergone by the support mounted on the rim under a load Z, the rated load of the tire, the envelope being confined between two cylinders of revolution of radius $R_{max}$ and $R_{min}$ satisfying the following relationship:

$$0.2f < R_{max} - R_{min} < 2f.$$

2. The support according to claim 1, wherein $R_{max} - R_{min}$ satisfies the following relationship:

$$0.3f < R_{max} - R_{min} < f.$$

3. The support according to one of claims 1 or 2, wherein a zone of radius $R_{min}$ of the envelope of the radially outer wall of the support crown is disposed axially at at least one lateral end of the support crown.

4. The support according to claim 3, wherein the zone of radius $R_{min}$ is disposed on a side of the support intended to be positioned on the outside of the vehicle.

5. The support according to claim 3, wherein the envelope of the outer wall of the support crown comprises a second zone of radius $R'_{min}$, greater than or equal to $R_{min}$, disposed axially on the other side of a circumferential median plane from the zone of radius $R_{min}$ and satisfying the relationship:

$$0.2f < R_{max} - R'_{min} < 2f.$$

6. The support according to claim 5, wherein the zone of radius $R'_{min}$ satisfies the relationship:

$$0.3f < R_{max} - R'_{min} < f.$$

7. The support according to claim 1, wherein the support crown comprises longitudinal grooves.

8. The support according to claim 1, wherein the envelope of the outer wall of the crown comprises, in axial section, at least one zone of substantially constant curvature.

9. The support according to claim 1, wherein the envelope of the outer wall of the crown has, in axial section, substantially constant curvature.

10. The support according to claim 1, wherein at least one lateral end of the envelope of the outer wall of the crown comprises a zone that is substantially a cylinder of revolution of a minimum radius of the envelope.

11. The support according to claim 1, wherein the annular body of the support comprises a plurality of radial partitions, distributed over the circumference and extending axially on either side of a circumferential median plane, and radial junctions extending substantially circumferentially and connected at each of their ends to two adjacent ones of the radial partitions.

* * * * *